United States Patent
Matsuyama

(10) Patent No.: US 11,397,375 B2
(45) Date of Patent: Jul. 26, 2022

(54) IMAGE PROJECTION APPARATUS

(71) Applicant: Ricoh Company, Ltd., Tokyo (JP)

(72) Inventor: Toshinobu Matsuyama, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 17/092,667

(22) Filed: Nov. 9, 2020

(65) Prior Publication Data
US 2021/0165308 A1 Jun. 3, 2021

(30) Foreign Application Priority Data

Nov. 28, 2019 (JP) .............................. JP2019-215874
Jul. 31, 2020 (JP) .............................. JP2020-131002

(51) Int. Cl.
*G03B 21/00* (2006.01)
*G03B 21/28* (2006.01)
*G02B 5/20* (2006.01)

(52) U.S. Cl.
CPC ........... *G03B 21/008* (2013.01); *G02B 5/208* (2013.01); *G03B 21/28* (2013.01)

(58) Field of Classification Search
CPC .... G03B 21/008; G03B 21/28; G03B 21/142; G03B 21/147; G03B 21/2013; G03B 21/2033; G03B 21/2053; G02B 5/0278; G02B 5/208; G02B 5/284; G02B 5/1861; H04N 9/315; H04N 9/3155; H04N 9/3158; H04N 9/3161; H04N 9/3164; H04N 9/3194; H04N 9/3197
See application file for complete search history.

(56) References Cited

U.S. PATENT DOCUMENTS 9,855,887 B1 * 1/2018 Potter ................. F21S 41/675
2007/0103599 A1 5/2007 Wen-Chin
(Continued)

FOREIGN PATENT DOCUMENTS

CN 106980220 A 7/2017
CN 109445253 A 3/2019
(Continued)

OTHER PUBLICATIONS

Office Action dated Apr. 21, 2022, in corresponding Chinese patent Application No. 202011286853.8, 9 pages.

*Primary Examiner* — Sultan Chowdhury
(74) *Attorney, Agent, or Firm* — Xsensus LLP

(57) ABSTRACT

An image projection apparatus includes a projection optical system configured to project an image with light emitted from a light source; a photodetector, and circuitry. The photodetector is configured to detect an amount of first light out of the light emitted from the light source and does not enter the projection optical system, and an amount of second light out of the light emitted from the light source and has passed through the projection optical system. The circuitry is configured to compare the amount of first light and the amount of second light, and control a notification device to perform a notification operation in response to reception of a comparison result that a difference in the amount of first light and the amount of second light is equal to or greater than a threshold.

9 Claims, 9 Drawing Sheets

(56) References Cited

U.S. PATENT DOCUMENTS

| | | | |
|---|---|---|---|
| 2008/0246715 A1* | 10/2008 | Nagase | H04N 9/3155 345/90 |
| 2009/0009730 A1* | 1/2009 | Destain | G03B 21/28 353/84 |
| 2009/0141252 A1* | 6/2009 | Kamijima | G03B 21/2033 353/85 |
| 2010/0134767 A1* | 6/2010 | Kwon | G03B 21/28 353/99 |
| 2012/0092623 A1* | 4/2012 | Huebner | G03B 21/2013 352/81 |
| 2013/0215156 A1* | 8/2013 | Li | G03B 21/14 345/690 |
| 2013/0329198 A1 | 12/2013 | Matsuyama | |
| 2016/0062075 A1 | 3/2016 | Matsuyama | |
| 2016/0131966 A1 | 5/2016 | Matsuyama | |
| 2017/0208302 A1 | 7/2017 | Katsumata et al. | |
| 2017/0214897 A1 | 7/2017 | Kado | |
| 2020/0370886 A1* | 11/2020 | Chen | G02B 7/021 |

FOREIGN PATENT DOCUMENTS

| | | |
|---|---|---|
| CN | 110488572 A | 11/2019 |
| EP | 3722878 A1 | 10/2020 |
| JP | 2004-163876 | 6/2004 |
| JP | 2007-171327 | 7/2007 |
| JP | 2008-299063 | 12/2008 |
| JP | 2017-134112 | 8/2017 |
| TW | 200719733 A | 5/2007 |

* cited by examiner

IMAGE PROJECTION APPARATUS

CROSS-REFERENCE TO RELATED APPLICATIONS

This patent application is based on and claims priority pursuant to 35 U.S.C. § 119(a) to Japanese Patent Application Nos. 2019-215874, filed on Nov. 28, 2019, and 2020-131002, filed on Jul. 31, 2020, in the Japan Patent Office, the entire disclosure of each of which is hereby incorporated by reference herein.

BACKGROUND

Technical Field

This disclosure relates to an image projection apparatus.

Related Art

Currently, a digital light processing (DLP) projectors are known. A DLP projector irradiates a color wheel with light emitted from a light source. The color wheel is constructed of several types of filters each of which transmits light of a specific wavelength. The filters are arranged along the circumference of a disk. The color wheel is rotated at high speed on an optical path of the light from the light source. The light transmitted through the filters of such a color wheel is directed to irradiate a light modulation element through a light tunnel. The light modulation element generates an image for projection (hereinafter "projection image") based on the light transmitted through the filters of the color wheel. The projection image is projected on a screen or the like via a projection optical system.

As the light modulation element, for example, a digital micro-mirror device (DMD) is used. The DMD generates a projection image in synchronization with the rotation of the color wheel based on image data input from an external device such as a personal computer. Specifically, the DMD generates the projection image while driving an image conversion element in synchronization with a rotation reference position signal obtained based on a rotation reference position of the color wheel, for synchronization of the color modulation of the signal.

SUMMARY

An embodiment of this disclosure provides an image projection apparatus that includes a projection optical system configured to project an image with light emitted from a light source; a photodetector, and circuitry. The photodetector is configured to detect an amount of first light out of the light emitted from the light source and an amount of second light out of the light emitted from the light source. The first light does not enter the projection optical system. The second light is light that has passed through the projection optical system. The circuitry is configured to compare the amount of first light and the amount of second light, and control a notification device to perform a notification operation in response to reception of a comparison result that a difference in the amount of first light and the amount of second light is equal to or greater than a threshold.

Another embodiment provides an image projection apparatus that includes a projection optical system configured to project an image with light emitted from a light source; a first photodetector, a second photodetector, and circuitry. The first photodetector is configured to receive, in a first optical path, first light out of the light emitted from the light source. The first optical path deviates from a second optical path extending from the light source to the projection optical system. The second photodetector is configured to receive, out of the light emitted from the light source, second light that has passed through the projection optical system. The circuitry is configured to compare an amount of the first light and an amount of the second light, and control a notification device to perform a notification operation in response to reception of a comparison result that a difference in the amount of the first light and the amount of the second light is equal to or greater than a threshold.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

Figure 1:
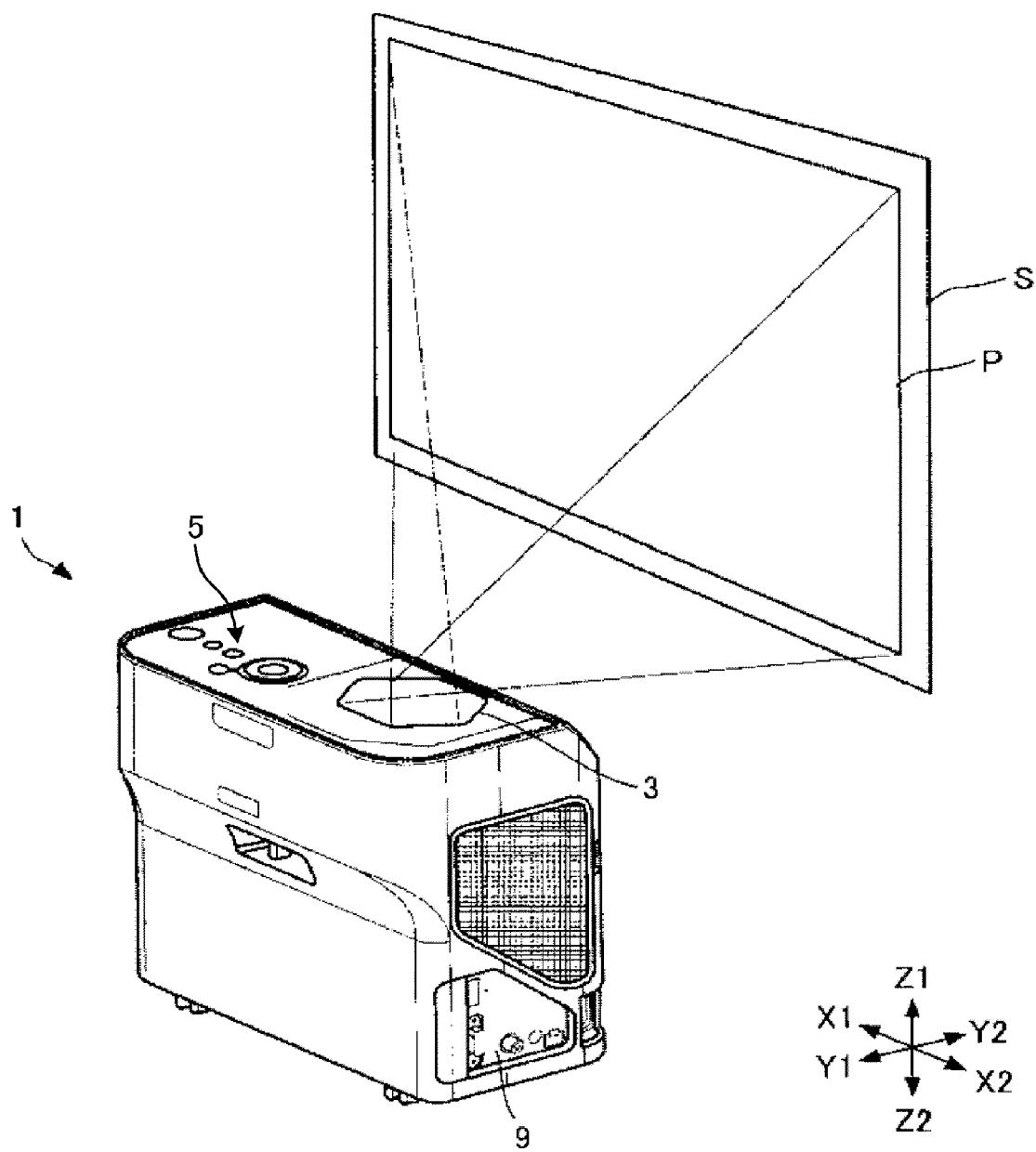
FIG. 1 is a perspective view illustrating an appearance of a projector according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operate in a similar manner, and achieve a similar result.

Referring now to the drawings, wherein like reference numerals designate identical or corresponding parts throughout the several views thereof, embodiments of this disclosure are described. As used herein, the singular forms "a," "an," and "the" are intended to include the plural forms as well, unless the context clearly indicates otherwise.

Hereinafter, a projector according to an embodiment of an image projection apparatus is described with reference to the drawings.

Configuration of Projector

Figure 2:
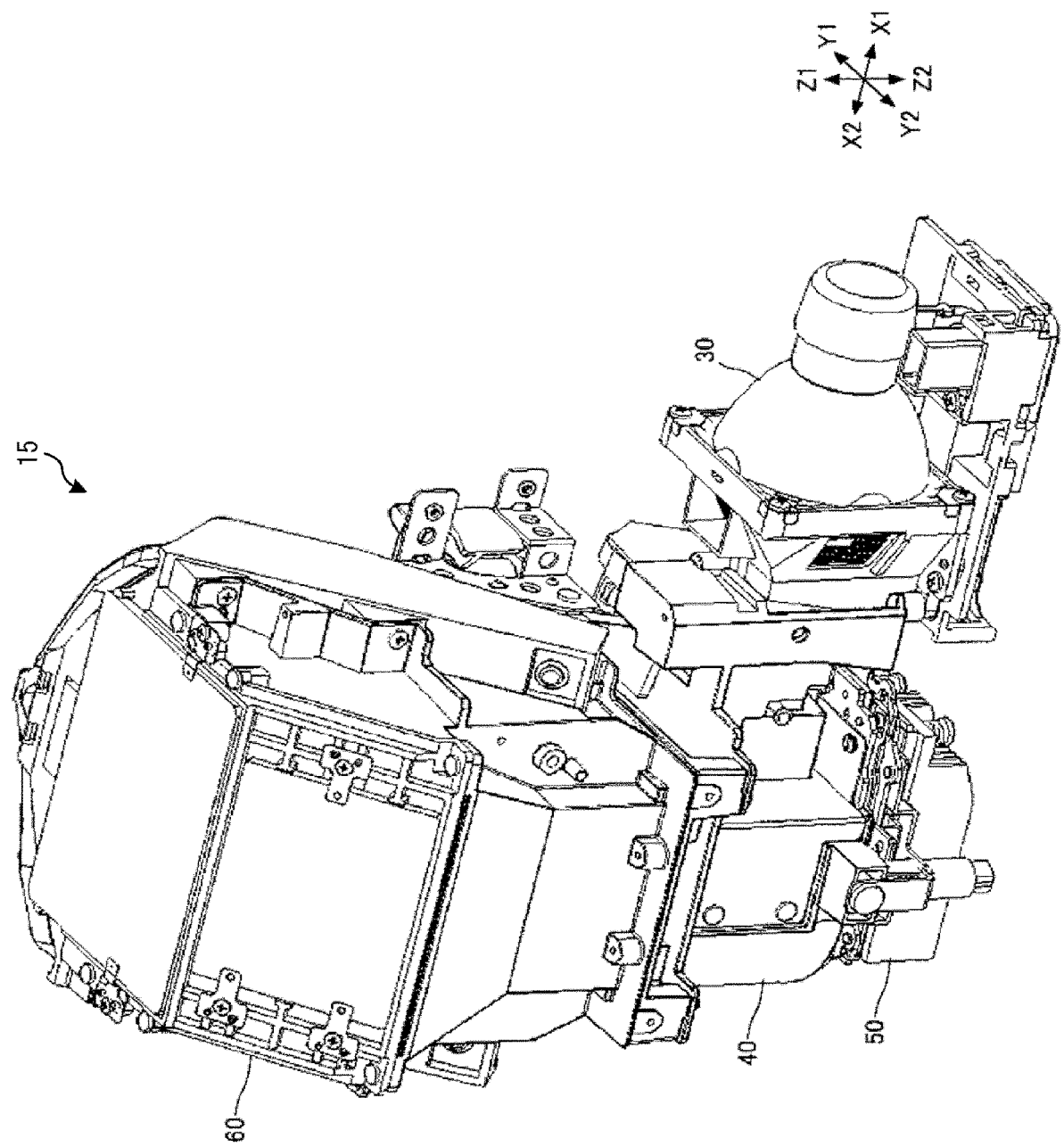
FIG. 2 is a perspective view of an optical engine of the projector illustrated in FIG. 1.
Figure 3:
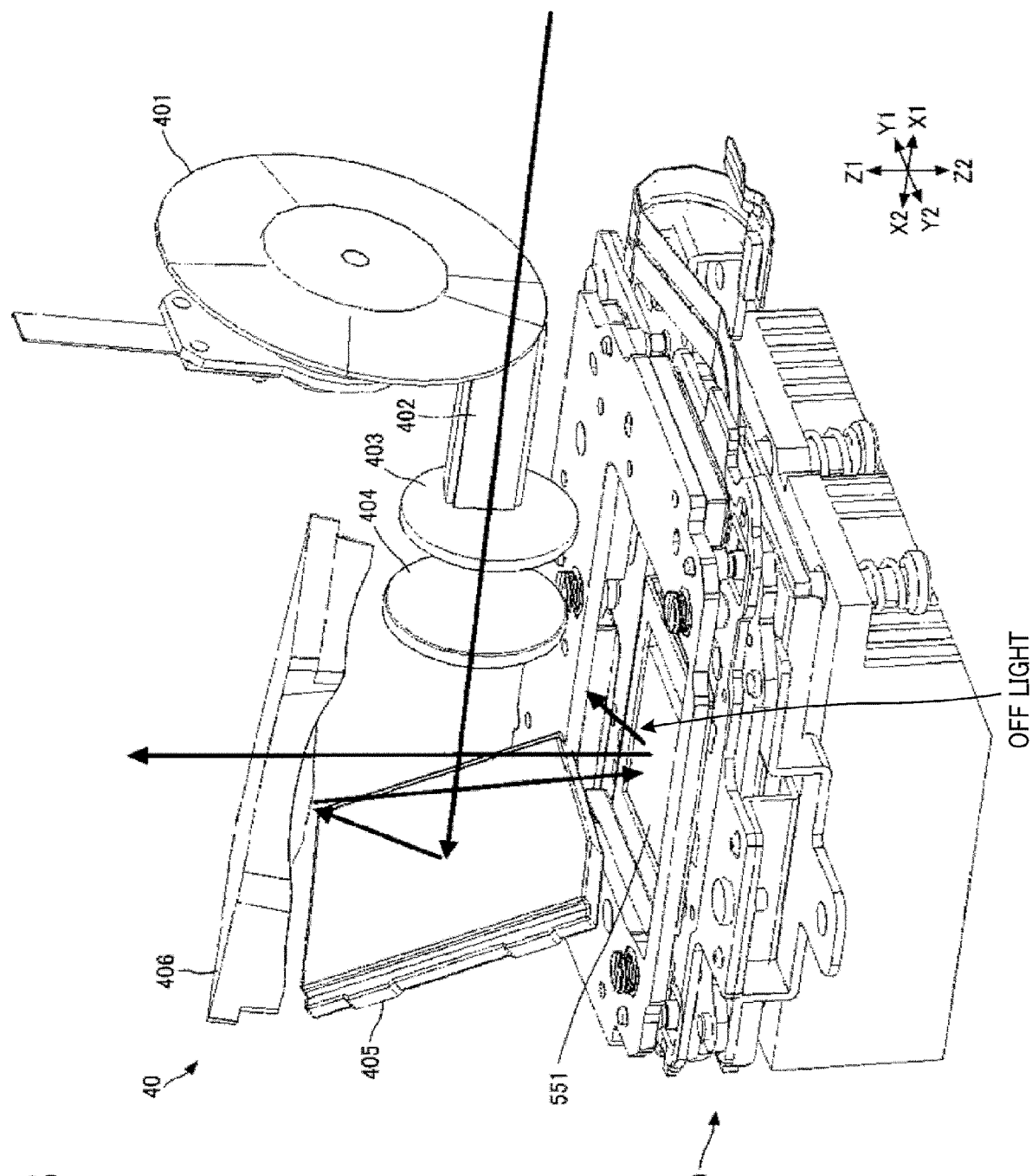
FIG. 3 is a perspective view of an illumination optical unit of the projector illustrated in FIG. 1.

FIG. 1 is a perspective view illustrating a projector 1 according to the present embodiment. FIG. 2 is a perspective view of an optical engine 15 of the projector 1 according to the present embodiment. FIG. 3 is a perspective view of an illumination optical unit 40 (an illumination optical system) of the projector 1 according to the present embodiment.

As illustrated in FIG. 1, the projector 1, which is an example of the image projection apparatus, includes an exit window 3 and an external device interface (I/F) 9. The projector 1 further includes the optical engine 15 (see FIG. 2) disposed therein, to generate a projection image. For example, in the projector 1, based on image data transmitted from a personal computer or a digital camera connected to the external device I/F 9, the optical engine 15 generates a projection image P. Then, the projector 1 projects the projection image P onto a screen S from the exit window 3. Note that, in FIG. 1, direction No errors found. X1-X2 represents a width direction of the projector 1, direction Y1-Y2 represents a depth direction of the projector 1, and direction Z1-Z2 represents a height direction of the projector 1.

Configuration of Optical Engine

As illustrated in FIG. 2, the optical engine 15 of the projector 1 according to the present embodiment includes a light source unit 30, the illumination optical unit 40, an image display unit 50, and a projection optical unit 60 (a projection optical system).

The light source unit 30 is disposed on a side face of the illumination optical unit 40 and emits light in the direction X2. The illumination optical unit 40 guides the light emitted from the light source unit 30 to the image display unit 50 disposed below the illumination optical unit 40. The image display unit 50 generates a projection image using the light guided by the illumination optical unit 40. The projection optical unit 60 is disposed above the illumination optical unit 40 and projects the projection image generated by the image display unit 50 to the outside of the projector 1.

The optical engine 15 according to the present embodiment is configured to project an image upward by using the light emitted from the light source unit 30. Alternatively, in another embodiment, the optical engine 15 may project an image in another direction, such as in a horizontal direction.

Configuration of Illumination Optical Unit

As illustrated in FIG. 3, the illumination optical unit 40 of the projector 1 according to the present embodiment includes a color wheel 401, a light tunnel 402, relay lenses 403 and 404, a reflective-and-transmissive mirror 405 (a fold-back mirror), and a concave mirror 406.

The color wheel 401 is, for example, a disc having filters respectively for, for example, red (R), green (G), and blue (B) in different portions in the circumferential direction of the disc. The color wheel 401 is rotated at high speed, and converts the light emitted from the light source unit 30 into light of each of RGB colors in a time division manner.

The light tunnel 402 is constructed of, for example, flat glass panels bonded into a square tubular shape. The light tunnel 402 reflects multiple times the light of each of RGB transmitted through the color wheel 401 on the inner face thereof to equalize the luminance distribution, and guides the light of each color to the relay lenses 403 and 404. The relay lenses 403 and 404 focus the light emitted from the light tunnel 402 while correcting the axial chromatic aberration.

The reflective-and-transmissive mirror 405 and the concave mirror 406 reflect the light emitted from the relay lenses 403 and 404 to a digital micro-mirror device (DMD) 551 disposed in the image display unit 50. The DMD 551 is an example of an image forming device, and generates a projection image by modulating the reflected light from the concave mirror 406.

Hardware Configuration

Figure 4:
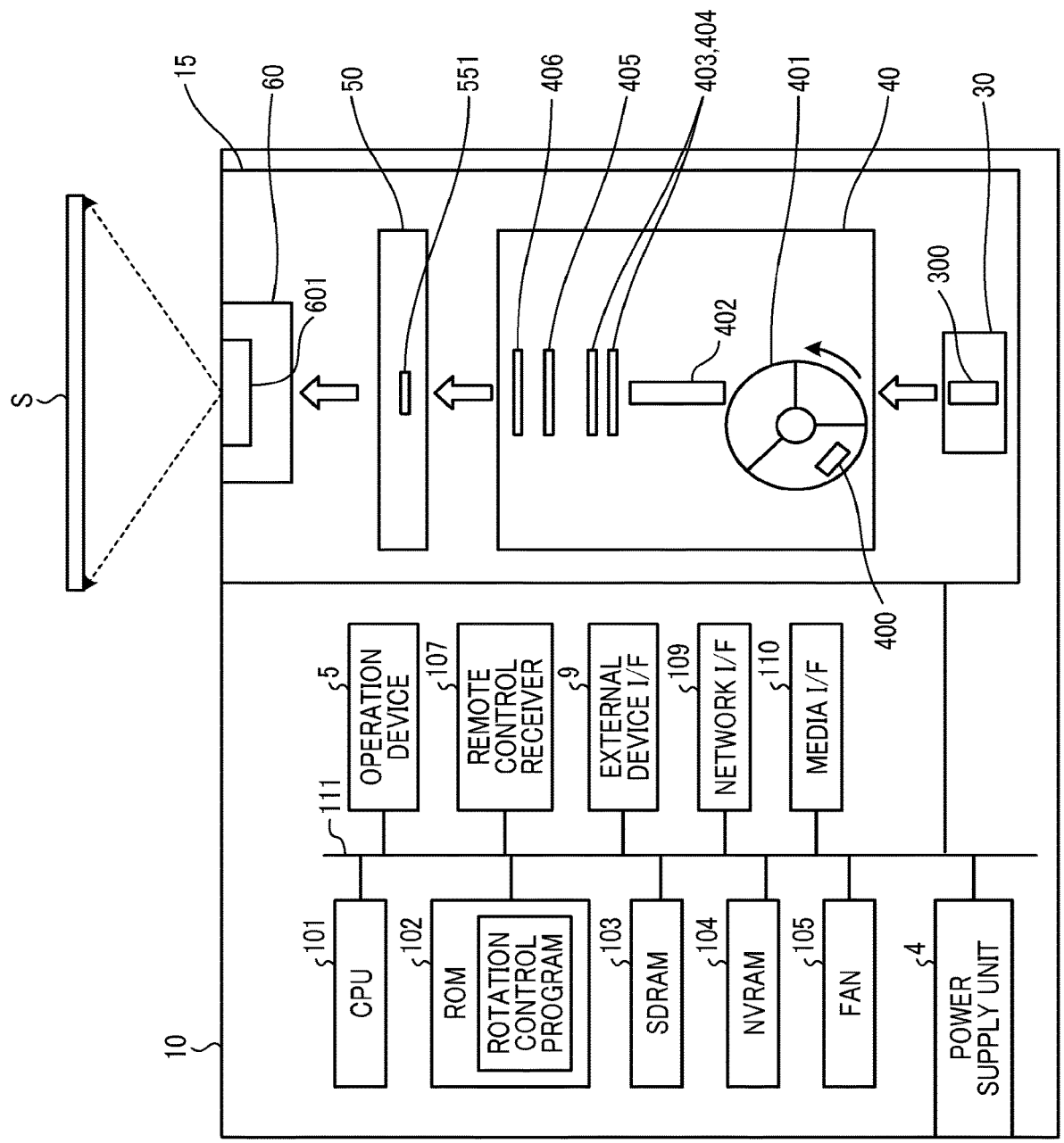
FIG. 4 is a diagram illustrating a hardware configuration of the projector illustrated in FIG. 1.

FIG. 4 is a diagram illustrating a hardware configuration of the projector 1. As illustrated in FIG. 4, the projector 1 includes a control unit 10 and the optical engine 15.

Configuration of Control Unit

The control unit 10 includes a central processing unit (CPU) 101, a read only memory (ROM) 102, a synchronous dynamic random access memory (SDRAM) 103, and a non-volatile random access memory (NVRAM) 104. The control unit 10 further includes a fan 105, an operation device 5, a remote control receiver 107, an external device I/F 9, a network I/F 109, a media I/F 110, and a power supply unit 4. The CPU 101 to the media I/F 110 and the power supply unit 4 are connected to each other via a bus line 111.

The CPU 101 controls the operation of the entire projector 1. The ROM 102 stores various programs executed by the CPU 101. For example, the ROM 102 stores a rotation control program of the color wheel 401. By executing the rotation control program, the CPU 101 implements each function described later with reference to FIG. 5. The SDRAM 103 is used as a work area for the CPU 101.

The operation device 5 includes various keys, buttons, a light-emitting element such as a light emitting diode (LED), a liquid crystal display screen, and the like. By operating the operation device 5, a user can perform instruction operations such as projection image size adjustment, color tone adjustment, focus adjustment, keystone adjustment, power mode change, image projection mode change, and the like. The contents of these operations are output to the CPU 101. Further, the light-emitting element (LED) or the liquid crystal display screen has a function of notifying the user of the state of the apparatus or the current setting. That is, the operation device 5 also has a function as a notification device.

The remote control receiver 107 is configured to receive commands from a remote controller. The remote control receiver 107 receives, from the remote controller, instruction operations such as the size adjustment operation of the projection image, the color tone adjustment operation, the focus adjustment operation, the keystone adjustment operation, the power mode change operation, and the image projection mode change operation. The remote control receiver 107 outputs the operation details to the CPU 101.

The fan 105 rotates or stops according to a control signal from the CPU 101, so as to exhaust air from inside the projector 1 and cool the inside of the projector 1. The media I/F 110 controls reading or writing (storing) of data to/from a storage medium such as a flash memory. Examples of the bus line 111 include an address bus and a data bus, which electrically connect the components with each other.

The network I/F 109 is an interface to perform data communication through a communication network such as the Internet. An external device such as a personal computer is connected to the external device I/F 9. The control signal or image data from the personal computer is acquired via the external device I/F 9.

Configuration of Optical Engine

The optical engine 15 generates a projection image based on the image data input to the projector 1, controlled by the CPU 101. The optical engine 15 includes the light source unit 30, the illumination optical unit 40, the image display unit 50, and the projection optical unit 60.

The light source unit 30 includes a light source 300 such as a light emitting diode (LED), and irradiates the illumination optical unit 40 with light under the control of the CPU 101. The light source 300 may be, for example, a high-pressure mercury lamp or a xenon lamp other than the LED.

The illumination optical unit 40 includes, for example, the color wheel 401, a rotation detection sensor 400, the light tunnel 402, the relay lenses 403 and 404, the reflective-and-transmissive mirror 405, and the concave mirror 406. The illumination optical unit 40 guides the light emitted from the light source 300 to the image display unit 50.

The color wheel 401 is disk-shaped and includes a plurality of segments (RGB transmission ranges) each of which transmits only light in a specific wavelength range, arranged in order in the rotation direction. The light emitted from the light source 300 is converted into light of each of RGB colors by the respective segments of the rotating color wheel 401. As the light passes through the color wheel 401, the light of each of RGB colors is repeated per unit time. The light exiting the color wheel 401 is directed toward the light tunnel 402.

The light tunnel 402 is constructed of, for example, flat glass panels bonded into a polygonal tubular shape. A silver or dielectric multilayer film or the like is vapor-deposited on the inner face of the light tunnel 402 to reflect light. The light tunnel 402 equalize the illuminance of the light emitted from the color wheel 401 and guides the light to the relay lenses 403 and 404.

The relay lenses 403 and 404 are two combined lenses. The relay lenses 403 and 404 correct the axial chromatic aberration of the light emitted from the light tunnel 402 and focus the light. The light that has passed through the relay lenses 403 and 404 enters the light modulation element (a display element) that is an image forming device of the image display unit 50 via the reflective-and-transmissive mirror 405 and the concave mirror 406.

The image display unit 50 modulates the light guided by the illumination optical unit 40 to generate a display image, controlled by the CPU 101. One example of the display element is the DMD 551 (micro mirror). The CPU 101 turns on and off the DMD 551 according to the image data, thereby modulating the input light. As the display element, for example, a liquid crystal panel or the like can be used instead of the DMD 551.

Figure 6A:
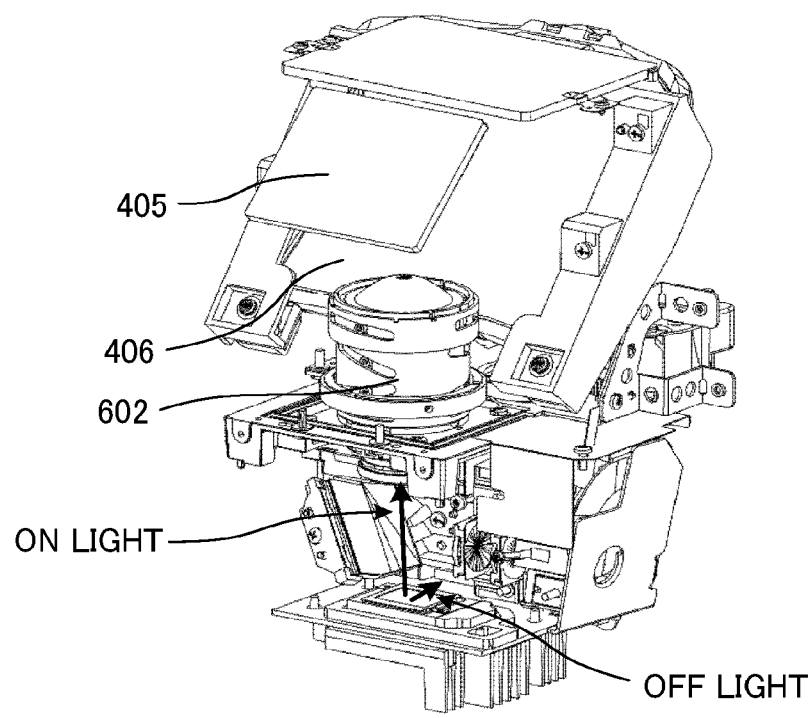
FIGS. 6A and 6B are perspective views illustrating an ON light path and an OFF light path of the projector illustrated in FIG. 1.
Figure 6B:
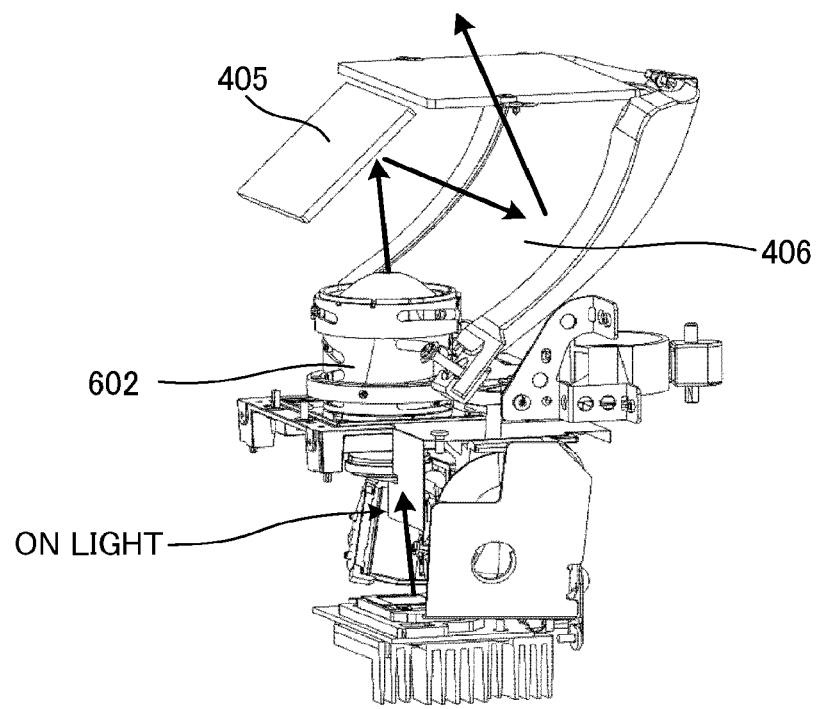

The projection optical unit 60 includes a projection mirror 601 and a projection lens 602 (see FIGS. 6A and 6B). The projection optical unit 60 magnifies, with the projection lens 602, the projection image generated by the DMD 551 of the image display unit 50 and projects the image on the screen S. A plurality of projection lenses 602 may be used, and another optical element such as a mirror may be used.

FIG. 1 is a view illustrating a state in which a projection image is projected from the upright projector 1 onto the screen S. The projector 1 can be installed in a state tilted by 90 degrees with a wide area portion thereof faces down, so as to project a projection image on the installation surface.

The DMD 551 needs to perform a modulation operation corresponding to the color of light at the timing at which the light of each of RGB colors emitted through the color wheel 401 reaches the DMD 551. Therefore, the output timing of the drive signal for causing the DMD 551 to perform the modulation operation needs to be synchronized with the rotation timing of the color wheel 401. For the synchronization, the color wheel 401 of the illumination optical unit 40 is provided with a marker for detecting the rotation position.

The illumination optical unit 40 further includes the rotation detection sensor 400 to detect the marker disposed at a rotation reference position on the color wheel 401.

When the marker is at the position opposite the rotation detection sensor 400, the rotation detection sensor 400 outputs a position detection signal indicating that the marker is at the rotation reference position. The above-mentioned synchronization control is performed based on such a position detection signal.

In response to power supply from the power supply unit 4 for start-up, based on the rotation control program stored in advance in the ROM 102, the CPU 101 turns on the light source 300 of the light source unit 30 and rotates the fan 105 at a predetermined rotation speed, which can be empirically obtained and stored in a memory. When the power supply to the projector 1 is started, the optical engine 15 becomes capable of displaying an image, and the power supply unit 4 supplies power to various other components.

Further, when the power switch of the projector 1 is turned off, a power off signal is supplied to the CPU 101. In response to detection of the power off signal, the CPU 101 turns off the light source 300. After that, when a predetermined time elapses, the CPU 101 stops the fan 105 to end the control process.

Functional Configuration

Figure 5:
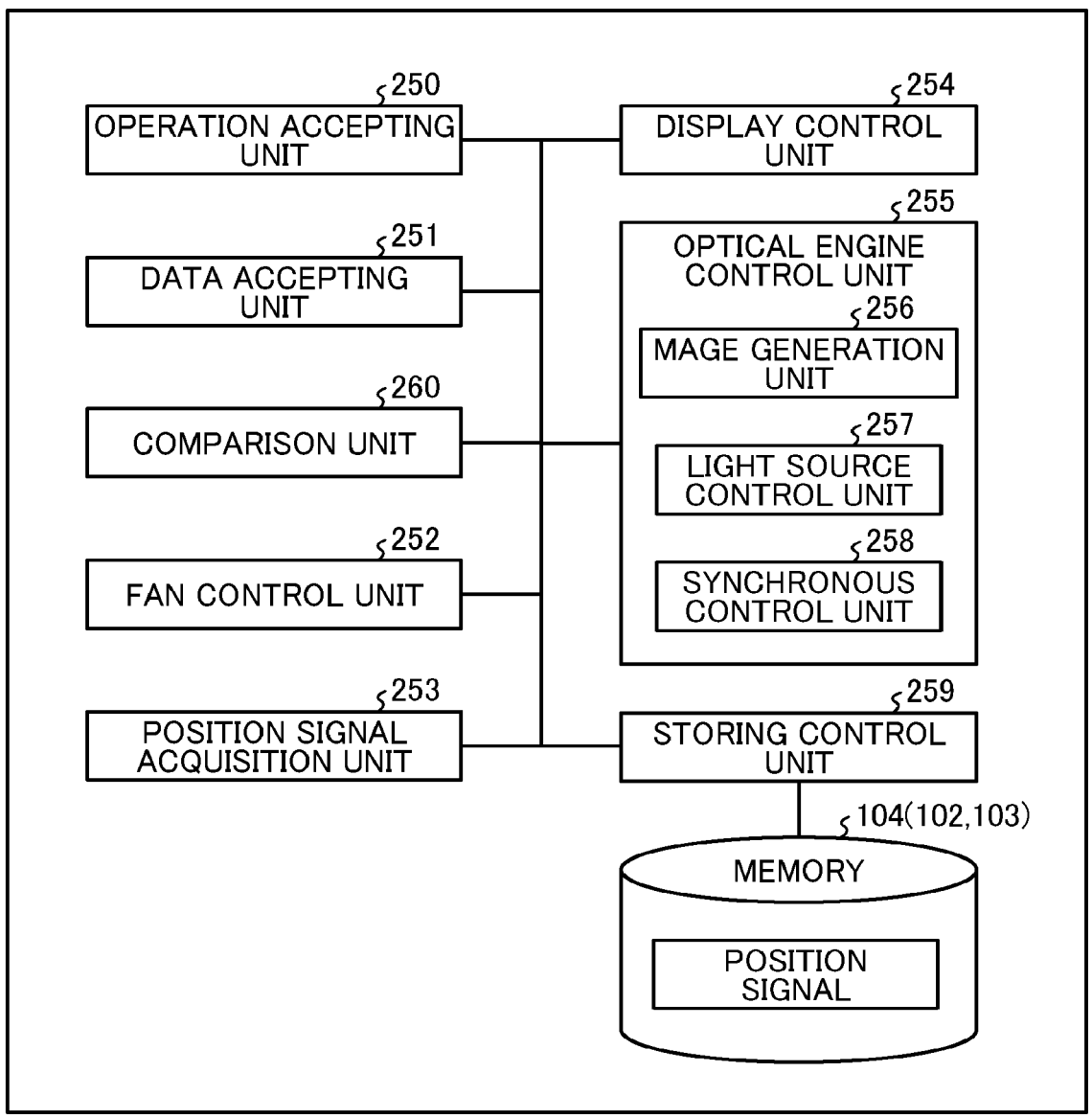
FIG. 5 is a block diagram illustrating a functional configuration of the projector illustrated in FIG. 1.

FIG. 5 is a block diagram illustrating a functional configuration of the projector 1. The CPU 101 of the projector 1 executes the rotation control program stored in the ROM 102, thereby implementing the respective functions of an operation accepting unit 250, a data accepting unit 251, a fan control unit 252, a position signal acquisition unit 253, a display control unit 254, an optical engine control unit 255, a storing control unit 259, and a comparison unit 260. The optical engine control unit 255 includes an image generation unit 256, a light source control unit 257, and a synchronous control unit 258.

The operation accepting unit 250 accepts input from the operation device 5 or input from the remote control receiver 107 to the CPU 101, thereby accepting various inputs by the user. The operation accepting unit 250 is implemented by the CPU 101 together with the operation device 5 or the remote control receiver 107. The display control unit 254 controls display on the operation device 5 under control of the CPU 101, thereby displaying, for example, various information about the projector 1, to the user. For example, when the operation device 5 includes a lamp, the display control unit 254 controls the lighting on and off of the lamp. In addition or alternatively, when the operation device 5 includes a touch panel, the display control unit 254 controls the display on the touch panel.

The data accepting unit 251 is implemented by the CPU 101 and the external device I/F 9, and receives various data such as image data input from an external device such as a personal computer. Similarly, the data accepting unit 251 is implemented by the CPU 101 and the network I/F 109, and receives various data such as image data input via a network such as a local area network (LAN) or the Internet.

The fan control unit 252 controls on and off of the rotation of the fan 105. The position signal acquisition unit 253 is implemented by the rotation detection sensor 400. The position signal acquisition unit 253 detects a signal indicating the rotation position of the color wheel 401 and outputs the signal to the optical engine control unit 255.

The optical engine control unit 255 includes the image generation unit 256, the light source control unit 257, and the synchronous control unit 258, and controls the entire optical engine 15. The light source control unit 257 controls the output of the light source 300. As one example, the light source control unit 257 controls the power supplied to the light source 300, to control the output of the light source 300.

The image generation unit 256 controls the DMD 551 of the image display unit 50 of the optical engine 15, based on the input image data or superimposed image data such as menu information, that is, on-screen display (OSD) data, thereby generating an image to be projected on the screen S.

The synchronous control unit 258 generates a synchronization signal to the light source 300, the color wheel 401, and the DMD 551 based on the rotation position signal from the position signal acquisition unit 253, and synchronizes movements thereof. For example, the synchronous control unit 258 synchronizes the cycle of displacement of the DMD 551 with the cycle of rotating the color wheel 401, for generating respective color images by the synchronous control time division.

The storing control unit 259 controls storing and reading out by the CPU 101 of various data in and from a storage area such as the SDRAM 103 or NVRAM 104. The storage area further stores in advance the magnitude of the voltage of a rotation detection pulse detected by the rotation detection sensor 400 as a position signal or the pulse width of the rotation detection pulse.

The comparison unit 260 compares a first light amount, which is the amount of light (first light) that does not enter the projection lens 602, measured by a first light receiver 701, with a second light amount, which is the amount of light (second light) that has passed through the projection lens 602 and is measured by a second light receiver 702. The display control unit 254 controls the display of, for example, a message relating to an abnormality (e.g., deterioration) of an optical component based on the comparison result of the comparison unit 260.

Although the description above concerns an example in which the operation accepting unit 250 to the storing control unit 259 are implemented by software, alternatively, a part or all of these functions can be implemented by hardware such as an integrated circuit (IC).

In another example, the rotation control program is stored in a computer-readable recording medium such as a compact disc read only memory (CD-ROM) and a flexible disk (FD), in an installable or executable file format, for distribution. In still another example, the rotation control program is stored in a computer-readable recording medium such as a compact disc-recordable (CD-R), a digital versatile disk (DVD), a Blu-ray Disc (registered trademark), and a semiconductor memory, for distribution. In still another example, the rotation control program is installed through a network such as the Internet or preloaded in a ROM, etc., of the device.

ON Light and OFF Light

FIGS. 6A and 6B are perspective views of the projector 1 having the configuration described above. FIG. 6A is a perspective view of the projector 1 as viewed obliquely from above, and FIG. 6B is a perspective view of the projector 1 as viewed from the substantially right side. The color-sequential projector 1 using the color wheel 401 divides, in time division manner, the light emitted from the light source unit 30 into the light of each of RGB colors with the color wheel 401. In the color wheel 401, the RGB color filters are sequentially arranged around the rotation axis. The light of each color divided in time division is projected onto the DMD 551, which is an example of the light modulation element, via the light tunnel 402, the relay lenses 403 and 404, the reflective-and-transmissive mirror 405, and the concave mirror 406.

The DMD 551 performs optical modulation based on the signal data of each color, and projects the light (projection image) through the projection lens 602. The DMD 551 generates one full-color image (projection image) by superimposing time-division images of respective colors. The light directed to the projection lens 602 is called "ON light". On the other hand, the light unnecessary for projection does not enter the projection lens 602 and is not used. Such unused light is called "OFF light."

The ON light (light required for the projection image) reflected by the DMD 551 enters the projection lens 602 from the lower side of the projection lens 602. The OFF light (light unnecessary for the projection image) deflected by the DMD 551 is directed to a light absorber 800 (see FIG. 7A) attached to a side face of the projection optical unit 60. Then, the light energy becomes heat and is cooled by the outside air flow. The reflective-and-transmissive mirror 405 and the concave mirror 406 are disposed above the projection lens 602.

The light coming out from the upper part of the projection lens 602 along the path of the projected light is folded by the reflective-and-transmissive mirror 405 and then further folded by the concave mirror 406 toward the screen. As the light reaches the screen, the light forms an image. Thus, the image is projected on the screen.

More specifically, the DMD 551 is paved with a large number (for example, millions) of extremely small reflection mirrors made of a material, such as aluminum, having a high reflectance. With the tilt (orientation) of each reflection mirror and control of the light source 300, various images can be projected.

The extremely small reflection mirrors are arranged in an array. Drive of each reflection mirror can be independently controlled (switched), for example, in a tilted state or a not tilted state. Such switching of the tilt of the reflection mirror creates a portion that passes through the projection optical unit 60 and is irradiated with light (bright pixels) and a portion that is not irradiated (dark pixels) on the projection surface such as the screen S. One reflection mirror corresponds to one pixel and can be switched between on and off at high speed.

The brightness of the projection image corresponds, for example, to on-off interval of each reflection mirror in one frame. When the period in which the reflection mirror is on is increased, the projection time of the light source 300 on the irradiation surface becomes long, so that the projection image becomes brighter. By contrast, when the period in which the reflection mirror is turned off is increased, the projection time of the light source 300 on the irradiation surface is shortened, resulting in a dark projection image. A DMD controller controls the on/off period of such a reflection mirror by pulse width modulation (PWM) control.

The color of the projection image is expressed by irradiating the DMD 551 with the light from the light source 300 of each color in a time-division manner. Each reflection mirror is turned on at the timing when the light source 300 of the color to be projected directs the light to the DMD 551. The reflection mirror can switch between on and off several thousand times per second, for example. Such a configuration can provide visual recognition of a color image in which the colors are combined, owing to the illusion of human eye (afterimage effect).

That is, a color image is generated by combining the lighting time of the light source 300 of each color and the ON/OFF time of the extremely small reflection mirrors. The light source 300 can be any light source to emit light that can be reflected by the extremely small mirrors, and, for example, a lamp, a light emitting diode (LED), a laser beam, or the like can be used. In addition to visible light, invisible light such as ultraviolet light and near-infrared light can be used.

Position of Light Receiver

Figure 7A:
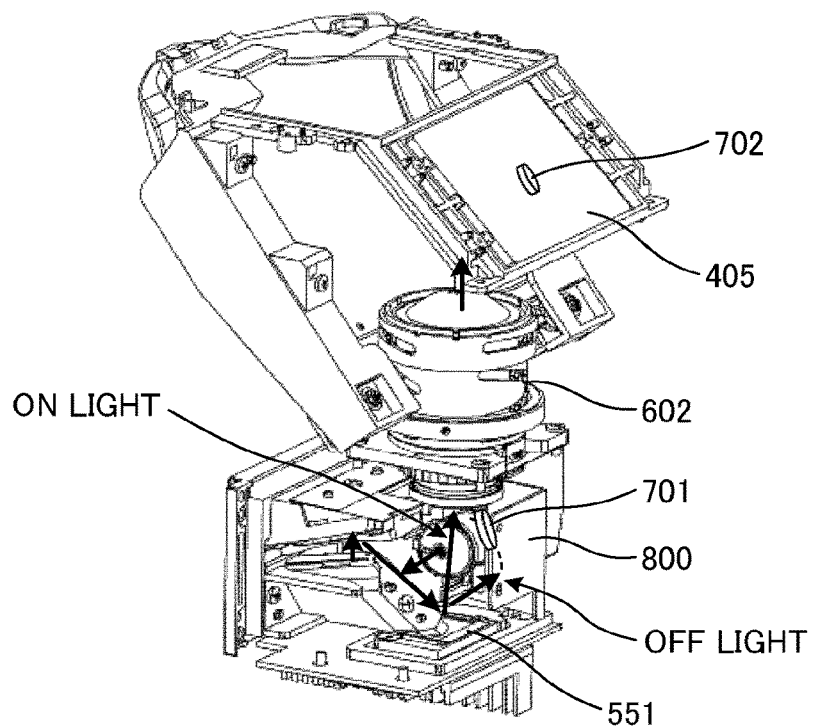
FIGS. 7A and 7B are views illustrating positions of a first light receiver to receive the OFF light and a second light receiver to receive the ON light of the projector illustrated in FIGS. 6A and 6B.
Figure 7B:
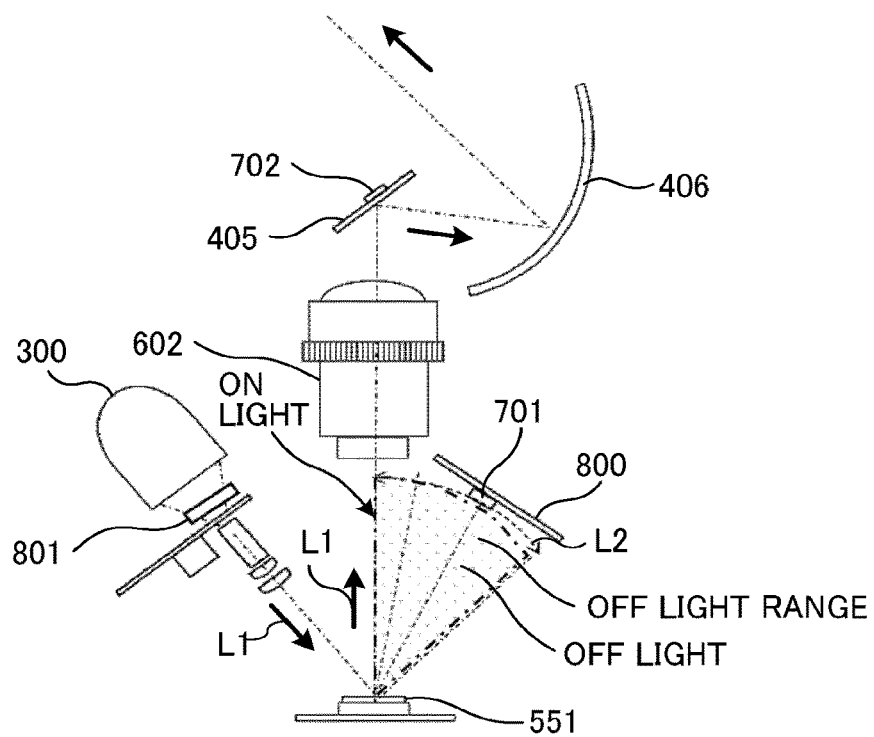

FIGS. 7A and 7B are views illustrating a layout of the first light receiver 701 and the second light receiver 702 of the projector 1. FIG. 7A is a perspective view of the projector 1 as viewed obliquely from upper left, and FIG. 7B illustrates an ON light path (a second optical path) and an OFF light path (a first optical path deviating from the second optical path) relative to the projection optical unit 60 which is a main part of the projector 1. In FIG. 7B, the solid arrow indicates the projected light path when the DMD 551 is off, and the dotted arrow indicates the incident light path.

Further, as illustrated in FIGS. 7A and 7B, in the case of the projector 1 according to the present embodiment, the first light receiver 701 is disposed at the position to receive the OFF light, which does not enter the projection lens 602 and thus is not used for the projection image. Further, in the case of the projector 1 according to the present embodiment, the second light receiver 702 is disposed on the back (or rear) face of the reflective-and-transmissive mirror 405, that is, downstream from the projection optical system (e.g., the projection lens 602) in the second optical path. The reflective-and-transmissive mirror 405 is an example of a reflective-and-transmissive member that reflects to guide, to a third optical path extending to the projection surface, a portion of the light that has passed through the projection optical system. The optical path from the reflective-and-transmissive mirror 405 via the concave mirror 406 to the screen S is an example of the third optical path. Further, the reflective-and-transmissive member allows passing of another portion of the light that has passed through the projection optical system. The first light receiver 701 and the second light receiver 702 are examples of photodetectors. The first light receiver 701 is an example of a first photodetector, and the second light receiver 702 is an example of a second photodetector. The light may be detected by three or more light receivers.

As the reflection mirror of the DMD 551 is driven, the direction of the light reflected thereby shifts as illustrated in FIG. 7B. When the DIVED 551 is OFF, all the light in the OFF light range (illustrated in FIG. 7B) other than the ON light is the OFF light. The first light receiver 701 receives the OFF light in the OFF light range. Further, as illustrated in FIG. 7B, the second light receiver 702 disposed on the back face of the reflective-and-transmissive mirror 405 receives a part of the light passing through the projection lens 602.

Optical Characteristics of Optical Filter

Figure 8:
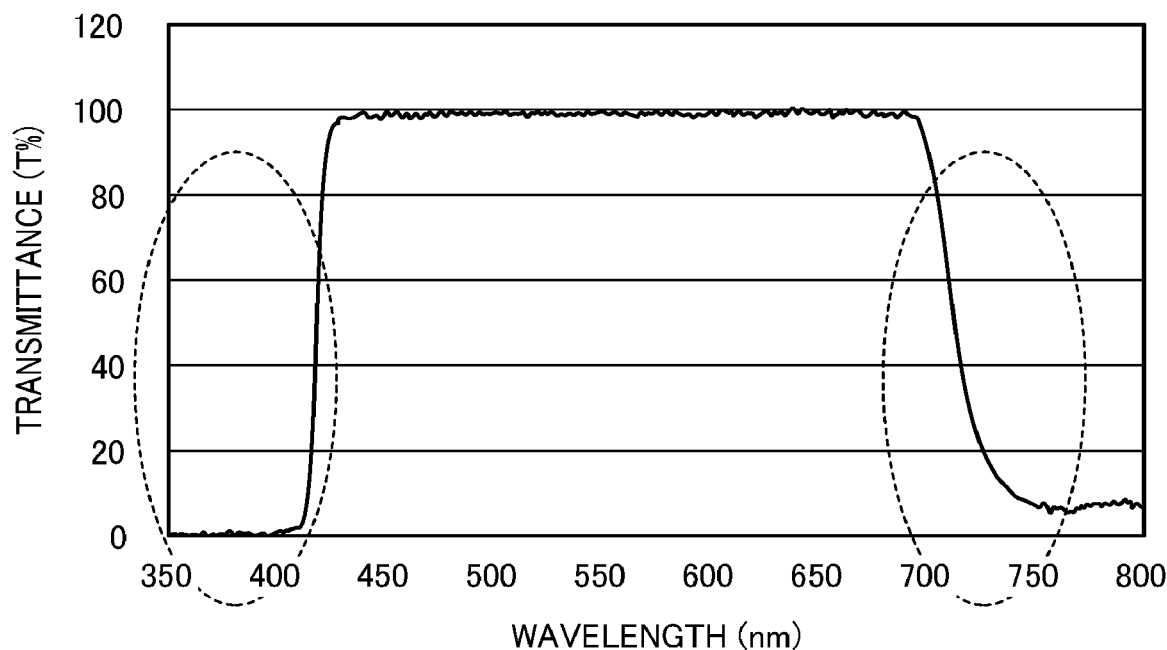
FIG. 8 is a graph illustrating optical characteristics of an optical filter that filters light from a light source of the projector illustrated in FIG. 1.

Further, in the projector 1 according to the present embodiment, an optical filter 801 is disposed between the light source 300 and the color wheel 401. FIG. 8 is a diagram illustrating the optical characteristics of the optical filter 801. The light source 300 emits light that includes an ultraviolet range (420 nm or less) to an infrared range (700 nm or more). The optical filter 801 has a transmittance characteristic that blocks light in an unnecessary range. The optical filter 801 inhibits deterioration of the components inside the optical system and reduces excessive heat to the components inside the optical system.

The light from the light source 300 transmitted through the optical filter 801 is colored to each of RGB (red, green, blue) by each segment of the color wheel 401, and exits the optical filter 801. Of the light that penetrates the optical filter 801, the light having a short wavelength of the ultraviolet range indicated by a broken circle in FIG. 8 or the light having a long wavelength of the infrared range has little effects on relative luminous efficiency or optical characteristics. The first light receiver 701 and the second light receiver 702 read such light that does not affect a projection image as measurement light.

That is, the first light receiver 701 and the second light receiver 702 has sensitivity to the light having a wavelength that can be used for measurement without affecting the projection image or optical performance, specifically, the light having a short wavelength of the ultraviolet range indicated by the broken circle in FIG. 8, or the light having a long wavelength of the infrared range. Accordingly, the first light receiver 701 and the second light receiver 702 read the light having such wavelengths.

When light receivers having sensitivity to the ultraviolet range are used as the first light receiver 701 and the second light receiver 702, preferably, white light or blue light is used. When light receivers having sensitivity in the infrared range are used as the first light receiver 701 and the second light receiver 702, preferably, white light or red light are used. As the measurement timing, the measurement may be performed every time the projector 1 is started, or at a predetermined timing (for example, empirically obtained and stored in a memory), such as, every several hours, every several days, every several weeks, or every time instructed by the user.

The first light receiver 701 and the second light receiver 702 may have sensitivity only to the short wavelength range or only to the long wavelength range. Since the amount of light in the short wavelength range is small, it is desirable that the long wavelength range is in a range of wavelength that does not affect the red optical characteristics or longer.

Measurement Operation of Light Receiver

Figure 9:
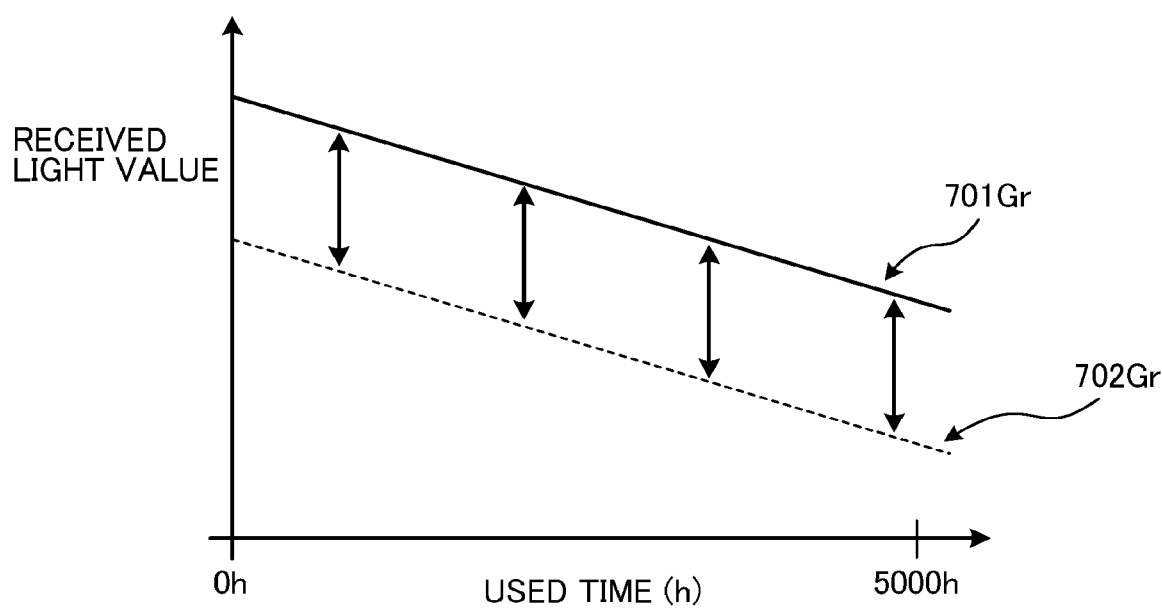
FIG. 9 is a graph illustrating a transition, based on the deterioration of a projection lens, of the difference in the amount of the OFF light and the ON light received by the first light receiver and the second light receiver illustrated in FIGS. 7A and 7B.

FIG. 9 is a graph illustrating measurement operations of the first light receiver 701 and the second light receiver 702. In FIG. 9, the horizontal axis represents the used time of the projection lens 602, and the vertical axis represents the measurement values (received light values) of the light receivers 701 and 702. A solid line graph 701Gr represents the transition of the measurement value of the first light receiver 701, and a broken graph 702Gr represents the transition of the measurement value of the second light receiver 702.

In FIG. 9, the measurement values of the first light receiver 701 and the second light receiver 702 have such a relationship with each other that the difference therebetween is substantially constant unless the projection lens 602 is deteriorated. The comparison unit 260 illustrated in FIG. 5 acquires the measurement values of the first light receiver 701 and the second light receiver 702 each time the predetermined time elapses, and compares the measurement values for detecting the deterioration of the projection lens 602.

Although the difference between the measurement values is substantially constant, there can be a measurement error. Accordingly, a tolerance such as 5% may be provided for the measurement width.

Notification Operation

In response to detection that the difference between the measured values of the first light receiver 701 and the second light receiver 702 is equal to or greater than a predetermined value (for example, empirically obtained and stored in a memory), the display control unit 254 (illustrated in FIG. 5, an example of the notification control unit) of the projector 1 according to the present embodiment displays a message prompting maintenance of the projector 1. Specifically, the display control unit 254 displays, a message such as "Projection lens has deteriorated. Please contact maintenance person." on the liquid crystal display screen (an example of the notification device) of the operation device 5. As a result, the user can recognize the deterioration of the projection lens 602 and can take appropriate measures such as maintenance. Alternatively, for the notification of the maintenance of the projector 1, the display control unit 254 can control the lighting or blinking of the light-emitting element (LED) of the operation device 5. Yet alternatively, voice, electronic sound, or the like can be used for the notification.

Optical Characteristics of Fold-Back Mirror

Figure 10:
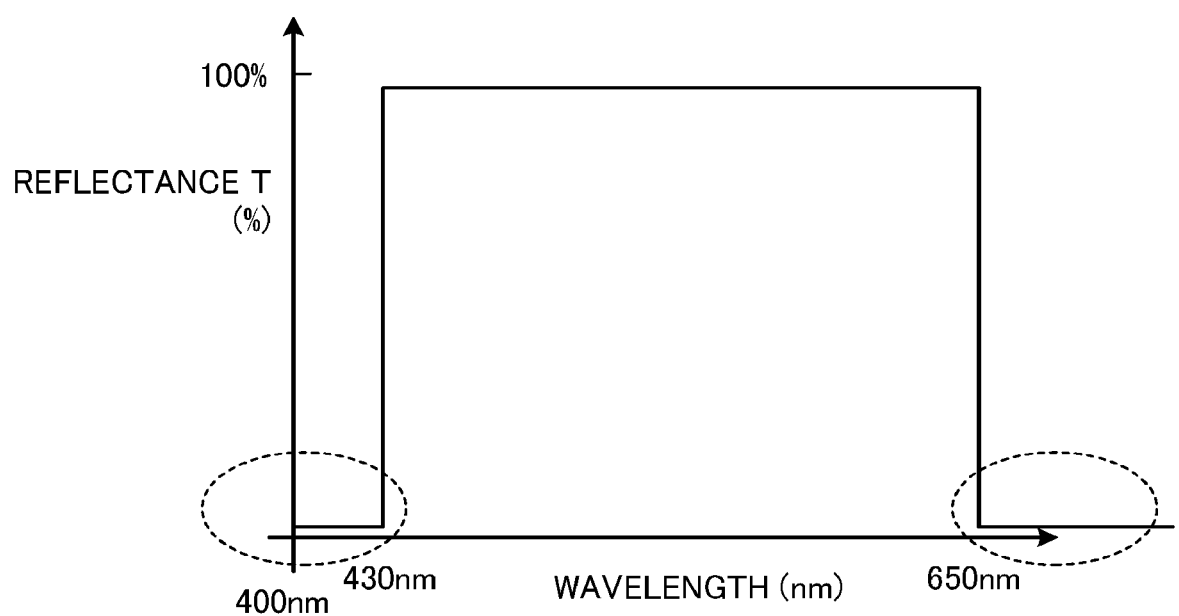
FIG. 10 is a diagram illustrating optical characteristics of a fold-back mirror into which ON light that has passed through a projection lens is incident, according to an embodiment.

FIG. 10 illustrates the optical characteristics of the reflective-and-transmissive mirror 405. For example, when the second light receiver 702 has sensitivity to the long wavelength range, preferably, the reflective-and-transmissive mirror 405 is a mirror, such as a dichroic mirror, that transmits light of a specific wavelength. In the example illustrate FIG. 10, the reflective-and-transmissive mirror 405 has such optical characteristics that the reflectance in the wavelength range of 430 nm to 650 nm is 95% or greater. In this case, the second light receiver 702 detects and measures the light that is in a wavelength range other than the wavelength range of 430 nm to 650 nm and penetrates the reflective-and-transmissive mirror 405, out of the light that reaches the reflective-and-transmissive mirror 405 from the projection lens 602.

As is clear from the above description, the projector 1 according to the present embodiment measures the amount of light before entering the projection lens 602 with the first light receiver 701, and measures the light that has penetrated the projection lens 602 with the second light receiver 702. Then, in response to the detection that the difference between the two measurement values is equal to or greater than the predetermined value, the projector 1 determines the deterioration of the projection lens 602 and performs a notification operation to the user or the like.

As a result, the projector 1 can properly detect the deterioration of the projection lens 602 and notify the user of the deterioration.

The above-described embodiments are presented as examples and are not intended to limit the scope of the present disclosure. The above-described embodiments can be implemented in other various forms, and various omissions, replacements, and changes can be made without departing from the scope of the invention.

In the description according to the present embodiment, the two light receivers 701 and 702 are used to monitor the state of the projection lens 602, but three or more light receivers may be used to monitor the status of the projection lens 602.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:

1. An image projection apparatus, comprising:
a projection optical system to project an image with light emitted from a light source;
a photodetector to detect:
an amount of first light out of the light emitted from the light source, the first light that does not enter the projection optical system; and
an amount of second light out of the light emitted from the light source, the second light that has passed through the projection optical system; and
circuitry configured to:
compare the amount of first light and the amount of second light; and
control a notification device to perform a notification operation in response to reception of a comparison result that a difference in the amount of first light and the amount of second light is equal to or greater than a threshold, wherein
the photodetector includes:
a first photodetector to receive the first light in a first optical path deviating from a second optical path from the light source to the projection optical system; and
a second photodetector to receive the second light downstream from the projection optical system in the second optical path.

2. The image projection apparatus according to claim 1, wherein the first photodetector and the second photodetector detect light in an infrared range.

3. The image projection apparatus according to claim 1, wherein the first photodetector and the second photodetector detect light in an ultraviolet range.

4. The image projection apparatus according to claim 1, further comprising:
a reflective-and-transmissive member to:
reflect to guide, to a third optical path, a portion of the second light that has passed through the projection optical system, the third optical path extending to a projection surface; and
allow passing of another portion of the second light, wherein
the second photodetector receives the portion of the second light passing through the reflective-and-transmissive member.

5. The image projection apparatus according to claim 1, further comprising:
the light source to emit the light that enters the projection optical system; and
an image forming device including a plurality of reflection mirrors, the image forming device disposed on an optical path of the light from the light source,
the plurality of reflection mirrors are independently oriented in a direction to reflect the light from the light source to the projection optical system and in a direction to deflect the light from the projection optical system, wherein
the first light is deflected by the plurality of reflection mirrors from the projection optical system, and the second light is reflected to the projection optical system by the plurality of reflection mirrors.

6. An image projection apparatus, comprising:
a projection optical system to project an image with light emitted from a light source;
a first photodetector to receive, in a first optical path, first light out of the light emitted from the light source, the first optical path deviating from a second optical path from the light source to the projection optical system;
a second photodetector to receive second light out of the light emitted from the light source, the second light that has passed through the projection optical system;
circuitry configured to:
   compare an amount of the first light and an amount of the second light; and
   control a notification device to perform a notification operation in response to reception of a comparison result that a difference in the amount of the first light and the amount of the second light is equal to or greater than a threshold; and
a reflective-and-transmissive member to:
   reflect to guide, to a third optical path, a portion of the second light that has passed through the projection optical system, the third optical path extending to a projection surface; and
   allow passing of another portion of the second light, wherein
   the second photodetector receives the portion of the second light passing through the reflective-and-transmissive member.

7. The image projection apparatus according to claim 6, wherein the first photodetector and the second photodetector to detect light in an infrared range.

8. The image projection apparatus according to claim 6, wherein the first photodetector and the second photodetector to detect light in an ultraviolet range.

9. The image projection apparatus according to claim 6, further comprising:
   the light source that emits the light that enters the projection optical system; and
   an image forming device including a plurality of reflection mirrors, the image forming device disposed on an optical path of the light from the light source, wherein
   the plurality of reflection mirrors are independently oriented in a direction to reflect the light from the light source to the projection optical system and in a direction to deflect the light from the projection optical system, and
   the first light is deflected by the plurality of reflection mirrors from the projection optical system, and the second light is reflected to the projection optical system by the plurality of reflection mirrors.

* * * * *